No. 817,635. PATENTED APR. 10, 1906.
G. R. FLOWERS.
EGG BEATER.
APPLICATION FILED JAN. 4, 1905.
2 SHEETS—SHEET 1.
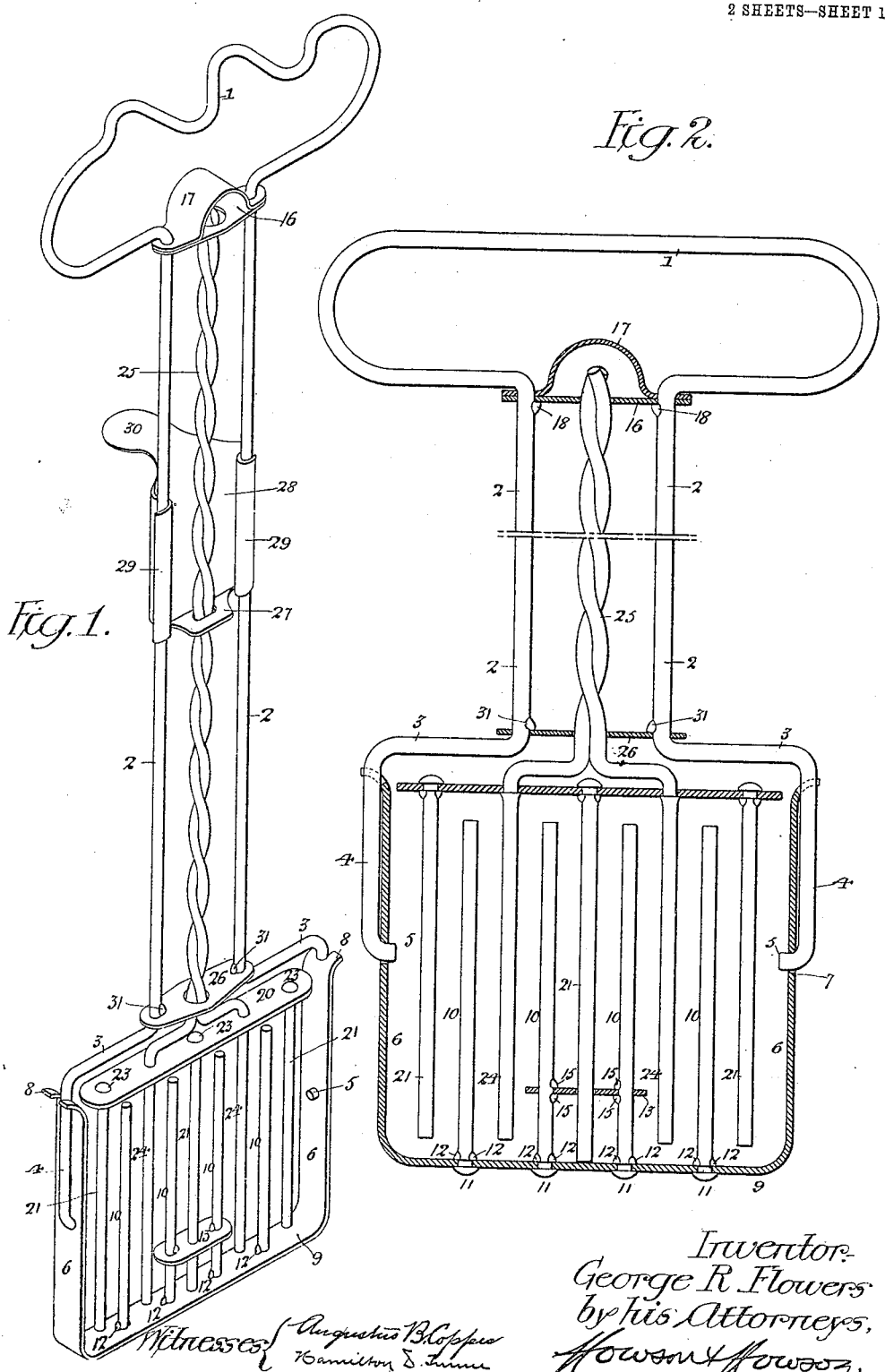

No. 817,635. PATENTED APR. 10, 1906.
G. R. FLOWERS.
EGG BEATER.
APPLICATION FILED JAN. 4, 1905.
2 SHEETS—SHEET 2.
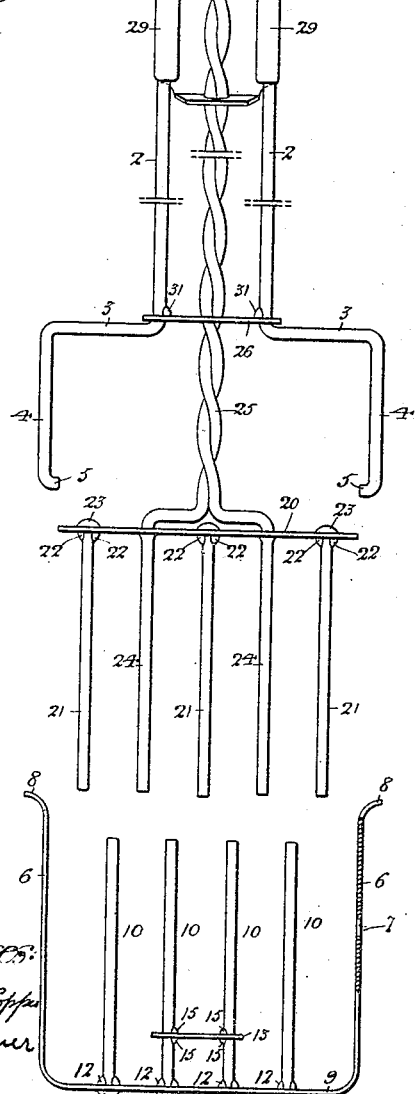
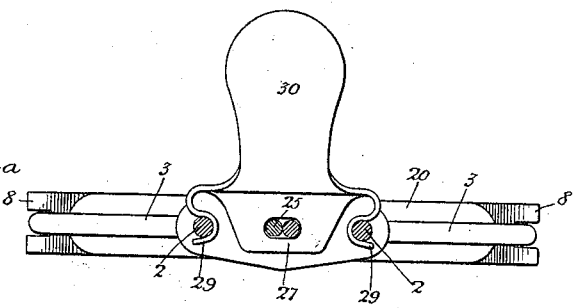
Fig. 4.
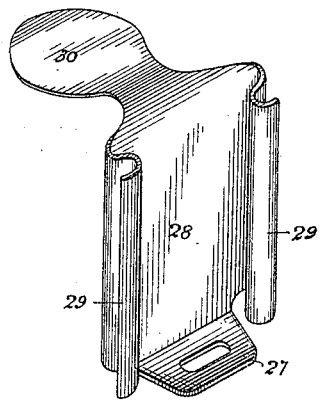
Fig. 5.
Witnesses:
Augustus B. Copps
K. S. Turner
Inventor:
George R. Flowers,
by his Attorneys,
Howson & Howson

UNITED STATES PATENT OFFICE.

GEORGE R. FLOWERS, OF PHILADELPHIA, PENNSYLVANIA.

EGG-BEATER.

No. 817,635.   Specification of Letters Patent.   Patented April 10, 1906.

Application filed January 4, 1905. Serial No. 239,618.

*To all whom it may concern:*

Be it known that I, GEORGE R. FLOWERS, a citizen of the United States, residing in Philadelphia, Pennsylvania, have invented certain Improvements in Egg-Beaters, of which the following is a specification.

My invention relates to that class of implements for beating eggs or whipping cream, in which implements are combined a frame and a beating member mounted therein and having a threaded shank or stem engaged by a nut mounted so as to be reciprocable on the frame, the object of my invention being to so construct an implement of this type as to simplify its construction and facilitate and reduce the cost of its manufacture. This object I attain in the manner hereinafter set forth, reference being had to the accompanying drawings, in which—

Figure 1 is a perspective view of an egg-beater constructed in accordance with my invention. Fig. 2 is a side elevation of part of the same, partly in section and on an enlarged scale. Fig. 3 is a side elevation illustrating certain elements of the implement separated from one another. Fig. 4 is an enlarged sectional plan view on the line *a a*, Fig. 3; and Fig. 5 is a perspective view of one of the members of the implement.

The fixed frame of the implement consists, mainly, of a piece of wire bent to form a yoke-like handle 1, from which depend opposite parallel bars 2, having outwardly-bent portions 3, terminating in depending legs 4, which are parallel with the bars 2 and have at their lower ends inwardly-projecting lugs 5. The wire constituting the top member of the yoke-like handle 1 is waved or corrugated in a horizontal plane, so that it provides a broad bearing for the hand and permits of the application of suitable downward pressure to the beater without injury to the hand. With these legs 4 engage opposite bars 6 of a U-shaped member composed of a strip of sheet metal, said bars 6 having openings 7 for the reception of the lugs 5 and being also provided with outwardly-bent and notched upper ends 8 for engaging with the legs 4, as shown in Figs. 1 and 2, whereby when the parts are properly secured together, as shown in said figures, a rectangular frame is formed for the reception of the beating member of the implement.

The bottom bar 9 of the U-shaped member of the rectanguar frame carries a series of upwardly-projecting fingers 10, which are rigidly secured to said bottom bar 9 by riveting the outer ends of the same upon the outer face of the bar—as shown, for instance, at 11— and by compressing or flattening the opposite sides of each finger at a point adjacent to the inner face of the bar 9, so as to form spurs 12, which project outwardly beyond the openings formed in the bar 9 for the reception of the lower ends of the fingers and bear upon the inner face of said bar 9, as shown in Fig. 2. A transverse plate 13 is secured to the innermost pair of bars 10 by forming upon said bars 10 spurs 15, located above and below the plate, as shown in Fig. 2, and the plate has an opening for the reception of one of the fingers of the beater member of the implement.

At the junction of the bars 2 and the outwardly-bent lower portions of the handle member of the fixed frame I locate a pair of plates 16 and 17, whose outer portions receive the bars 2, said plates 16 and 17 being confined between the outwardly-bent portions of the handle member and spurs 18, formed upon the bars 2, as clearly shown in Fig. 2. The lower plate 16 has an opening which constitutes a bearing for the upper portion of the screw-stem of the beating member, and the curved central portion of the plate 17 acts as a shield or guard for the upper end of said screw-stem.

The beater member comprises a transverse top plate 20, to which depending fingers 21 are secured by the formation of spurs 22 and riveted ends 23 thereon in the same manner as the fingers 10 are secured to the bottom bar 9 of the U-shaped member of the fixed frame, and intermediate depending fingers 24 are secured to the transverse plate 20 by upsetting said fingers 24, so as to thicken the same on the under side of the plate 20, and then bending them inwardly above the said plate, so as to prevent the rise of the latter. The inwardly-bent portions of the fingers 24 are then twisted together, so as to form a threaded shank or stem 25, which passes through an opening in a stay-plate 26 and through a slotted and projecting flange 27 upon a slide-plate 28, which has at opposite sides curved wings 29 for engaging the opposite bars 2 of the fixed frame and at the top a projecting tongue 30, which may be grasped between the finger and thumb and which thus serves as a convenient means for applying power to the slide-plate 28, so as to move it up and down on the bars of the fixed frame. The slotted flange 27 of the plate 28 constitutes a nut, whose engagement with the screw-stem 25 will as said plate 28 is moved up and down on the bars 2 cause rotation of the screw-stem and its beater first in one direction and then in the opposite direction with a speed depending directly upon the speed of reciprocation of the plate 28. The fingers 21 and 24 of the beater member are thus caused to move rapidly back and forth in proximity to the fingers 10 of the fixed frame, with the result that the eggs or other bodies subjected to their action are rapidly beaten or whipped to a stiff froth.

The brace-plate 26 is secured to the bars 2 of the fixed frame by confinement between the outwardly-bent portions 3 of said bars 2 and spurs 31, formed on the bars, as shown in Fig. 2.

The various members of the implement constructed in the manner described can be readily assembled by first springing the curved tongues 29 of the plate 28 into engagement with the bars 2, then inserting the screw-stem 25 through the brace-plate 26 and slotted flange 27 and moving it upwardly until its upper end enters the opening in the plate 16, whereupon the U-shaped member of the fixed frame can be readily secured in place by bending inwardly the side bars 6 of the same and adjusting it so that the openings 7 in said bars are in line with the lugs 5 and the lower end of the central finger 21 of the beater member has passed through the opening in the transverse plate 13, whereupon the bars 6 are permitted to spring outwardly, so that the lugs 5 will enter the openings 7 in said bars and the notched and outwardly-bent upper ends 8 of the bars will engage with the legs 4, as shown in Figs. 1 and 2. By a reversal of these operations the parts can be readily separated one from another for cleansing or other purposes.

Having thus described my invention, I claim and desire to secure by Letters Patent—

1. The combination, in an egg-beater, of a frame having parallel bars, a beater member having a screw-stem, and a slide-plate having elongated wings parallel with the screw-stem, and bent to slidably engage the parallel bars of the frame, and a slotted flange which engages the screw-stem and acts as a nut, substantially as specified.

2. An egg-beater having a fixed frame consisting of a wire waved or corrugated in a horizontal plane to form a handle and parallel bars outwardly bent at their lower portions and terminating in depending legs with inwardly-projecting legs at their lower ends, and a U-shaped member with side bars engaging said legs and having openings for the reception of the lugs thereon, upwardly-projecting fingers secured to the bottom bar of the said U-shaped member, a bearing-plate connecting the intermediate pair of said fingers, brace-plates connecting the upper and lower ends of the parallel bars, a slide-plate having bent wings guided on said parallel bars and having a slotted flange, and a beater member comprising a plate with depending fingers, the central finger having its bearing in the plate carried by the fingers of the fixed frame, and other fingers of the beater member being bent toward each other above the plate and twisted to form a screw-stem which has its bearing in the upper and lower brace-plates of the fixed frame and engages the slotted flange of the slide-plate, substantially as specified.

In testimony whereof I have signed my name to this specification in the presence of two subscribing witnesses.

GEO. R. FLOWERS.

Witnesses:
WALTER CHISM,
JOS. H. KLEIN.